Nov. 3, 1959

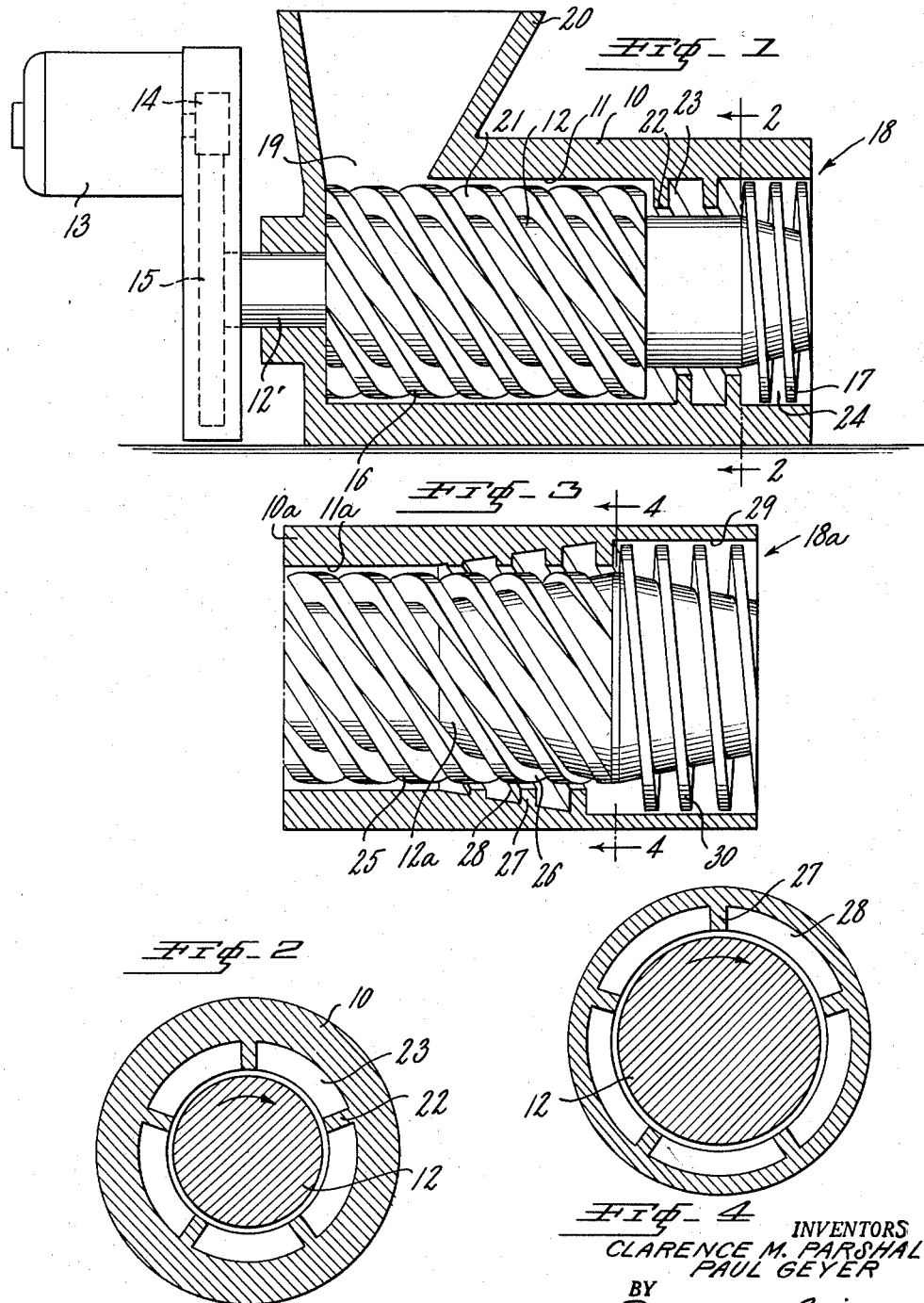

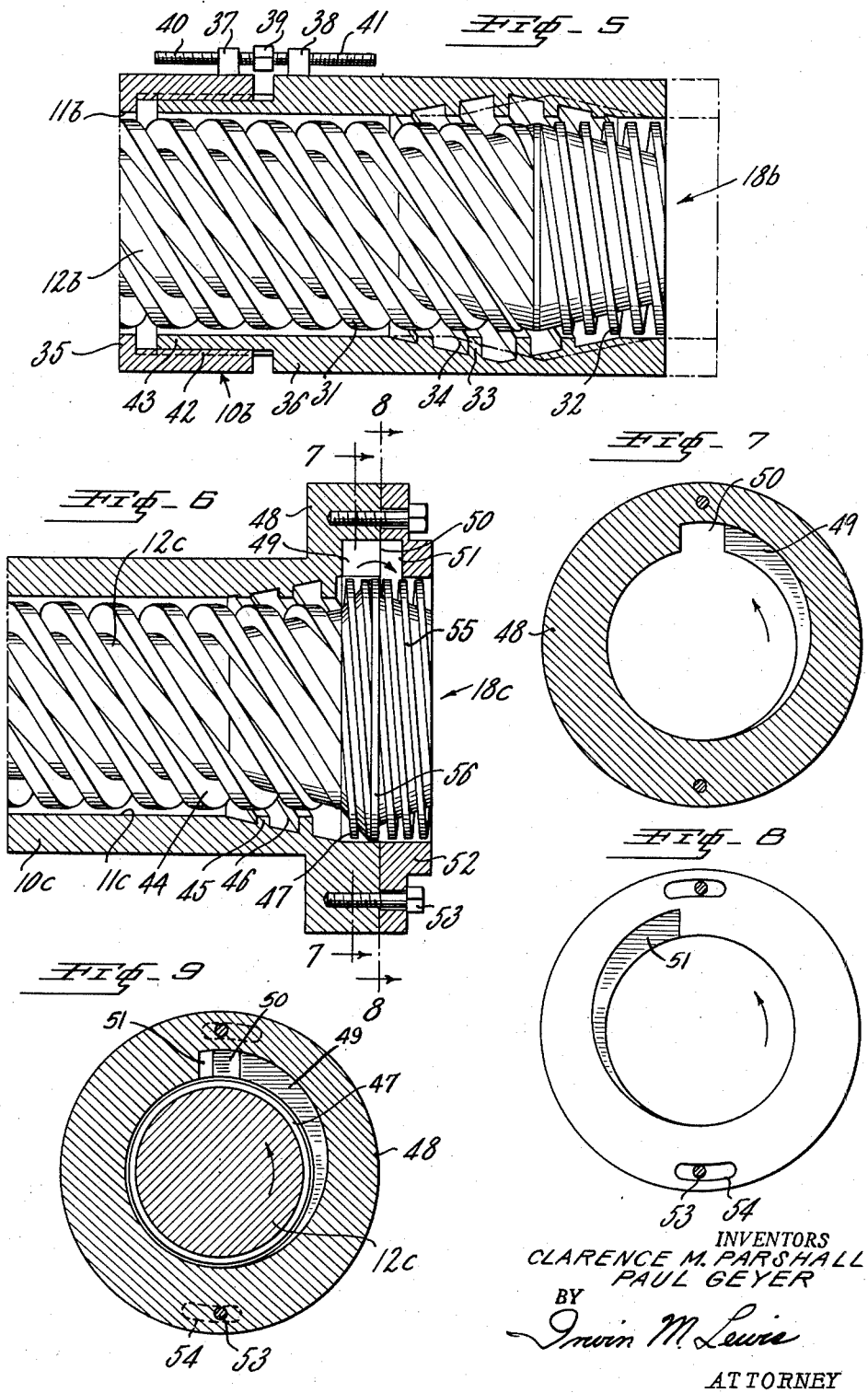

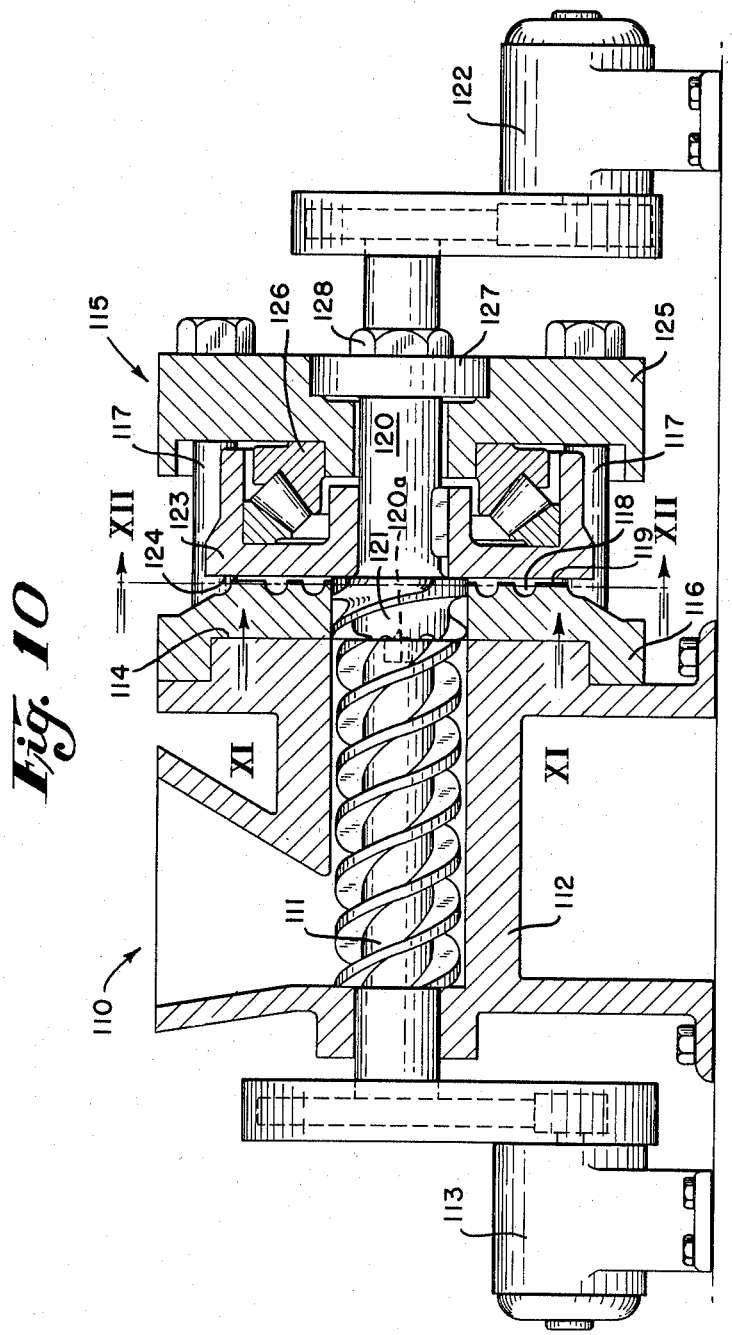

C. M. PARSHALL ET AL 2,910,726

PELLETIZING APPARATUS

Filed Aug. 20, 1957

INVENTOR.
CLARENCE M. PARSHALL
PAUL GEYER
BY
Irwin M. Lewis
ATTORNEY.

Nov. 3, 1959  C. M. PARSHALL ET AL  2,910,726
PELLETIZING APPARATUS

Filed Aug. 20, 1957  5 Sheets-Sheet 5

INVENTOR.
CLARENCE M. PARSHALL
PAUL GEYER
BY
*Irwin M. Lewis*
ATTORNEY.

United States Patent Office 2,910,726
Patented Nov. 3, 1959

2,910,726

PELLETIZING APPARATUS

Clarence M. Parshall and Paul Geyer, Detroit, Mich., assignors to United States Rubber Company, New York, N.Y., a corporation of New Jersey Application August 20, 1957, Serial No. 679,323

10 Claims. (Cl. 18—12)

This invention relates to apparatus for pelletizing rubber-like compounds to facilitate handling thereof in subsequent operations.

This application is a continuation-in-part of our co-pending application Serial No. 416,784, filed March 17, 1954 and now abandoned for Pelletizing Apparatus, which in turn was a continuation-in-part of our now abandoned application Serial No. 313,310 for Pelletizing Apparatus, filed October 6, 1952, and all assigned to the same assignee as the instant application.

It is common practice to pelletize rubber-like compounds by extruding the stock through stationary orifices and cutting off sections of the extruded stock by means of a moving sharpened knife to form pellets. It is also common practice to incorporate such a method of pelletizing in a screw or worm type mill by providing an orificed plate at the discharge end of the mill through which the stock is extruded by rotation of the screw or worm and by extending the shaft of the screw or worm through the plate and attaching sharpened knives thereto which rotate therewith to cut the extruded stock into pellets.

Such apparatus, however, has certain disadvantages among which are the maintenance of the sharpened knives and the necessity of a seal of some kind around the screw or worm shaft where it passes through the stationary orificed plate. Other disadvantages are the necessity of cleaning out the orifices after each batch of stock has been run and the necessity of heating the stock or providing high pressures to properly extrude the stock.

It is one object, therefore, of the present invention to provide apparatus for pelletizing rubber-like compounds which eliminates the necessity of sharpened knives and the maintenance problem inherent in the use thereof.

Another object is to provide apparatus for forming rubber-like compounds into substantially spherical shaped pellets.

Another object is to provide a screw or worm type mill incorporating apparatus for pelletizing rubber-like compounds which eliminates the necessity of the provision of seals around the shaft of the worm or screw at the discharge end of the mill.

Another object is to provide a screw or worm type mill incorporating apparatus for pelletizing rubber-like compounds which is self-cleaning.

A still further object is to provide a screw or worm type mill incorporating apparatus for pelletizing rubber-like compounds which is adjustable to vary the rate of flow of the material through the mill.

To accomplish the above advantages, the pelletizing apparatus of the present invention differs from apparatus heretofore used in that a novel arrangement of grooves in the rotor and barrel is utilized to pelletize the stock rather than sharpened knives.

Other objects and advantages of the invention will become apparent from the following description when read in conjunction with the accompanying drawings wherein;

Fig. 1 is a sectional elevational view of a screw type mill embodying the present invention;

Fig. 2 is a sectional view taken on the lines 2—2 of Fig. 1;

Fig. 3 is a partial sectional elevational view showing a modification of the mill of Fig. 1;

Fig. 4 is a sectional view taken on the line 4—4 of Fig. 3;

Fig. 5 is a partial sectional elevational view showing another modification of the mill of Fig. 1;

Fig. 6 is a partial sectional elevational view of still another modification of the mill of Fig. 1;

Fig. 7 is a sectional view taken on the line 7—7 of Fig. 6 with the rotor removed;

Fig. 8 is a sectional view taken on the line 8—8 of Fig. 6 with the rotor removed;

Fig. 9 is a sectional view taken on the line 7—7 of Fig. 6 showing the rotor in place;

Fig. 10 is a vertical, central, cross-sectional view through a preferred form of our invention;

Figure 12:
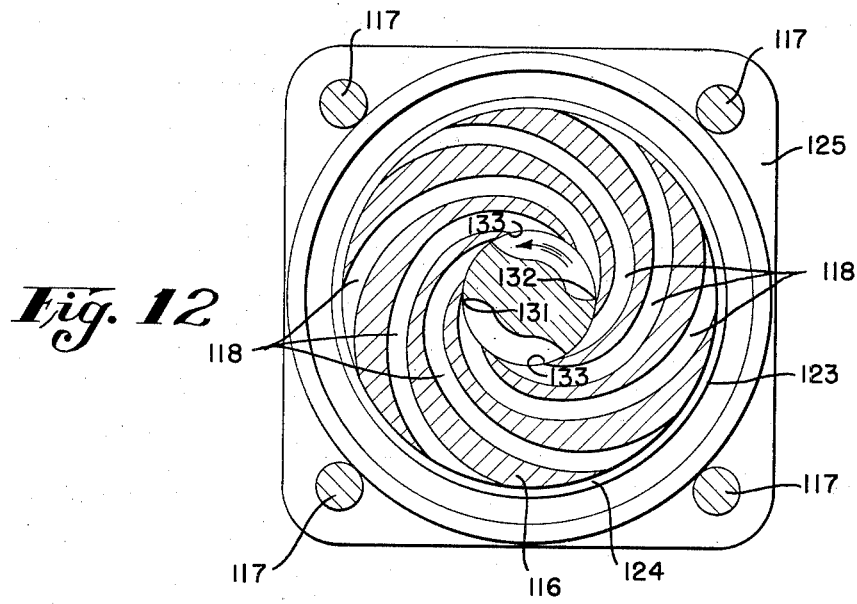
Fig. 12 is a cross-sectional view taken on the line 12—12 of Fig. 10.

Referring to Figs. 1 and 2 of the drawings, there is shown one embodiment of the present invention as incorporated in a mill or tuber for rubber-like compounds. This embodiment includes an elongated stationary barrel 10 open at one end providing a bore 11 in which a rotor 12 is rotatably mounted. A motor 13 coupled to an extension 12' of the rotor 12 by means of reduction gears 14 and 15 serves to rotate the rotor 12. The rotor 12 is provided with two sets of helical threads 16 and 17. The first set 16 terminates at a point spaced from the open discharge end 18 of the barrel 10 and serves to force stock introduced through an opening 19 in the top of the barrel towards the discharge end 18 when the rotor 12 is rotated in the direction of the arrow of Fig. 2. A funnel shaped hopper 20 surrounding the opening 19 facilitates introduction of stock into the mill. The stock is carried in grooves 21 formed between the threads 16. The second set of helical threads 17 initiate adjacent to but spaced from the point of termination of the first set of threads 16 and extend towards the discharge end 18. The second set of threads 17 serve to pelletize the stock as will hereinafter be described.

Interposed between the first set of threads 16 and the second set of threads 17 are helical threads 22 formed in the bore 11 of the barrel 10. The threads 22 provide grooves 23 therebetween which communicate at one end with the threads 16 and at the other end with the threads 17. The grooves 23 serve as passages through which the stock is forced by threads 16 upon rotation of the rotor 12.

The ends of the threads 17 extend across the open ends of the grooves 23 and as the rotor 12 is rotated they sever small portions from the stock extruded through the ends of the grooves 23. These small portions of stock occupy grooves 24 formed between the threads 17. The threads 17 are preferably of increasing depth toward the discharge end 18 of the barrel 10 so that the grooves 24 therebetween increase in cross-sectional area toward the discharge end and so that the small severed portions of stock will move freely toward the discharge end 18 as the rotor 12 is rotated. As these small portions move toward the discharge end 18, they are rolled between the base of the grooves 24 and the bore 11 of the barrel 10 and expand radially because of the increase in depth of the threads 17 to form substantially spherical shaped pellets.

In Figs. 3 and 4 there is shown a modification of the apparatus of Fig. 1. Only the modified portion is shown, it being understood that the other portions are identical with those of the apparatus of Fig. 1. Like the apparatus of Fig. 1, the modification of Fig. 3 includes a barrel 10a providing a bore 11a in which is rotatably mounted a rotor 12a. A first set of helical threads 25 on the rotor 12a gradually decrease to zero depth at a point spaced from the discharge end 18a. Stock is forced through the bore 11a of the barrel 10a by the threads 25 upon rotation of the rotor 12a and is forced radially outwardly from grooves 26 formed between the threads 25 when it reaches the point where the threads 25 decrease in depth. A set of helical threads 27 of gradually increasing depth providing grooves 28 therebetween are formed in the bore 11a of the barrel 10a and communicate with the portions of the threads 25 which are of decreasing depth so as to receive the stock forced out of the grooves 26.

The interior of the barrel 10a is increased in diameter adjacent the point of termination of the threads 27 to provide an enlarged bore 29. The ends of the grooves 28 open into the large bore 29, as shown in Fig. 4, to provide passages through which the stock is extruded. A second set of helical threads 30, similar to the threads 17 of the apparatus of Fig. 1, are provided on the end of the rotor 12a. The ends of the threads 30 extend across the open ends of the grooves 28. The threads 30 gradually increase in depth towards the discharge end 18a and serve to pelletize the stock extruded through the open ends of the grooves 28 in the same manner as described in conjunction with the apparatus of Fig. 1.

The advantage of the modification of Figs. 3 and 4 is that all the stock in passing from the grooves 26 formed between the threads 25 to the grooves 28 formed between the threads 27 is subjected to the intensive shearing action developed in the clearance between the rotor 12a and the bore 11a of barrel 10a and is thoroughly mixed and worked in the manner described in our U.S. Patent No. 2,744,287.

In Fig. 5 there is shown another modification of the invention. This modification also includes a barrel 10b providing a bore 11b in which a rotor 12b is rotatably mounted. In this modification a first set of helical threads 31 gradually decrease to zero depth at a point spaced from the discharge end 18b in the same manner as threads 25 of the modification of Figs. 3 and 4. A second set of helical threads 32 similar to the threads 17 and 30 of the modifications of Figs. 1 and 3 initiate adjacent the point of termination of threads 31 and increase in depth towards the discharge end 18b. Helical threads 33 providing grooves 34 therebetween are provided in the bore 11b of the barrel 10b. The threads 33 gradually increase in depth to a maximum depth then decrease to zero depth. The grooves 34 provide passages through which the stock may pass from the threads 31 to the threads 32. Stock extruded through the grooves 34 is pelletized by the threads 32 in the same manner as described in conjunction with the threads 17 and 30 of the modifications of Figs. 1 and 3.

It can be seen that the grooves 34 act as restrictive passages which control the flow of the stock to the threads 32. The restrictive effect is determined by the amount the portion of grooves 34 of decreasing depth overlaps the threads 32. The greater the overlap, the less the restriction. By adjusting the amount of overlap, the rate of flow of the stock through the mill and therefore the degree of working of the stock can be controlled. To provide such adjustment, the barrel 10b is made into two sections 35 and 36. Section 36 carries the threads 33 and is adjustable longitudinally with respect to the section 35 and the rotor 12a so that the amount the threads 33 overlapping the threads 32 can be varied. Adjustment is provided by means of threaded lugs 37 and 38 secured to the sections 35 and 36, respectively, and a bolt 39 which has oppositely threaded ends 40 and 41 which are threaded into lugs 37 and 38. Rotation of bolt 39 in one direction moves the sections 35 and 36 apart and rotation in the other direction pulls them together to vary the amount of overlap of the threads 33 with respect to the threads 32. Maximum rate of flow occurs when the sections 35 and 36 are adjusted to the dashed line positions shown in Fig. 5. The mating ends of the sections 35 and 36 are provided with telescoping portions 42 and 43 to allow for relative adjustment.

Referring to Figs. 6, 7, 8 and 9 there is shown still another modification of the apparatus of the invention. Like the modification of Fig. 5, this modification is also provided with means for controlling the rate of flow of stock through the mill as will be described.

This modification includes a barrel 10c providing a bore 11c in which a rotor 12c is rotatably mounted. Like the modification of Fig. 5 the rotor 12c is provided with helical threads 44 which gradually decrease to zero depth at a point spaced from the discharge end 18c and which serve to force the stock through the mill. A set of helical threads 45 of increasing depth are provided in the bore 11c to receive the stock from the threads 44 upon rotation of the rotor 12c in the manner described in conjunction with the modification of Fig. 3. The stock received by the threads 45 is extruded out through the open ends of grooves 46 formed between the threads 45. Stock so extruded is picked up by a set of helical threads 47 which are formed on the rotor 12c and initiate adjacent the point of termination of the threads 45. The threads 47 extend across the open ends of the grooves 46 and decrease in depth in the direction away from the ends of the grooves 46 so that stock received between the threads 47 is forced radially outward.

The barrel 10c is provided with a flange portion 48 in which is formed a circumferential extending groove 49 which communicates with the threads 47. The groove 49, as best shown in Fig. 7, is of gradually decreasing depth and extends only partially around the inner circumference of the flange portion 48. Groove 49 serves to receive the stock forced radially outwardly by the threads 47. Stock so received is forced through a side opening 50 provided at the larger end of the groove 49 into a circumferentially extending groove 51 formed in a ring 52 secured to the end of the barrel 10c and forming an extension thereof.

As best shown in Fig. 8, the groove 51 is of decreasing depth and extends in the opposite direction from the groove 49. The larger end of the groove 51 overlaps the opening 50 of the groove 49 as best shown in Fig. 9. The amount of overlap determines the rate of flow and therefore the amount of working and mixing the stock is subjected to in its passage through the mill. Adjustment of the overlap is provided by means of bolts 53 and arcuate slots 54 provided in the ring 52. Bolts 53 serve to secure the ring 52 to the end of the barrel 10c and the slots 54 provide for angular rotative adjustment of the ring 52 relative to the end of the barrel to thereby vary the amount of overlap of the groove 51 with the opening 50. It can be seen that rotation of the ring 48 in one direction would close the opening 50 while rotation of the ring in the other direction would open the opening 50. The effective size of the opening 50 can therefore be restricted to provide for the desired rate of flow of the stock through the mill by adjustment of the ring 52.

Groove 51 communicates with helical threads 55 of increasing depth provided on the end of the rotor 12c. Stock forced through groove 51 is therefore picked up by threads 55 and pelletized in the same manner as previously described. An integral circumferential rib 56 formed on the rotor 12c between the threads 47 and threads 55 prevents passage of stock directly from threads 47 to threads 55 so that the stock must flow through grooves 49 and 51.

Figure 11:
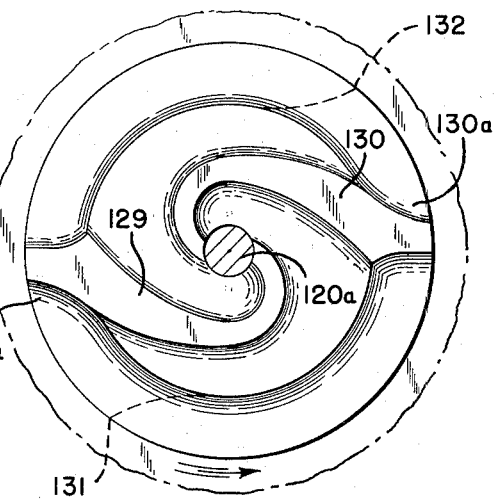
Fig. 11 is an elevational view taken on the plane 11—11 of Fig. 10.

Referring now to Figs. 10, 11 and 12, there is disclosed in full detail a preferred embodiment of the invention in which there is shown in combination a conventional tuber 110 and the pelletizing device indicated generally at 115. The tuber consists of a housing 112 having a feed hopper and a smooth bore cylindrical passage in which a worm shaft 111 is rotatably mounted. This shaft is driven by means of a motor 113, at a proper predetermined speed, through a gear train diagrammatically shown in Fig. 10. At the discharge end of the tubular passage of the housing 112, is a formation providing a face plate 114 on which is mounted the pelletizing device 115.

This device has a stationary ring 116 securely bolted to the face plate 114 by means of spacer bolts 117. The ring 116 has a series of grooves 118, see Fig. 12, cut on the surface face 119 thereof, which is its outer face. An external mounting plate 125 is also mounted on the spacer bolts 117 in parallel spaced relation to the grooved face 119. Journaled in a bearing 127, mounted in the plate 125, is a shaft 120 on the inner end of which is a rotor 121 having an extension 120a nesting in a circular recess in the end of the worm shaft 111. The rotor 121 rotates and has snug fit in the central passage of the ring 116. The rotor 121 has two spiral shaped ribs 129 and 130 defined by similarly shaped grooves on its surface which run out at the periphery into diametrically opposed passages 129a and 130a, as clearly shown in Fig. 11. These grooves are fed with the material being processed by the worm shaft 111, and they in turn deliver this material as pellets into the inner ends of a series of spiral grooves 118 cut in the face 119 of the ring 116. Keyed to shaft 120 is a cup shaped member 123 having a smooth face 124. Interposed between this member 123 and the support plate 125, is a roller thrust bearing 126. The nut 128 serves to lock the shaft 120 with the rotor 121 and the member 123 keyed thereto in assembled relation. Shaft 120 is driven by a motor 122 through a suitable reduction gear diagrammatically illustrated in Fig. 10, at the proper speed.

The material supply grooves 129a and 130a feed material into the pelletizing grooves 118 in measured amounts by reason of the formation of the cutting edges 131 and 132, at the outer extremities of the ribs 129 and 130, and their coaction with the leading edges 133 of the inner extremities of the grooves 118. The coaction of these cutting edges serves to cut off small amounts of the material being processed, which are then rolled outwardly along the grooves 118 by reason of the coacting rotary action of the surface 124 of the member 123, thereby producing pellets which are discharged from the apparatus at the outer peripheral spaced ends of the spiral grooves 118. The difference in speeds of the cooperating parts, produced by the motors 113 and 122 is determined by the gear ratios of the driving gear trains, insures the correct operation of this device, having in mind that these differential speeds are in part determined by the nature of the materials being processed.

Figure 13:
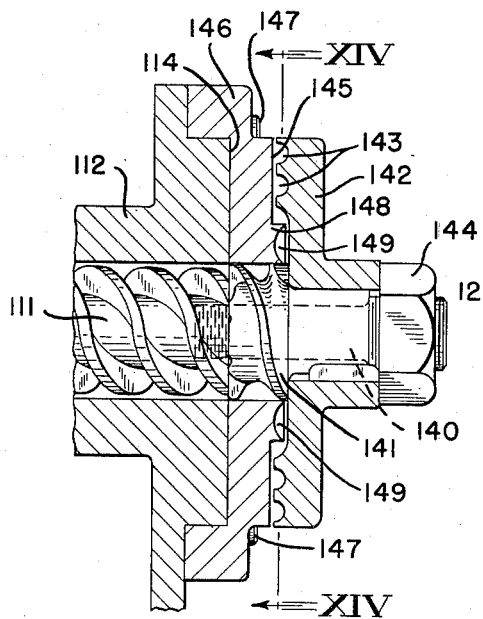
Fig. 13 is a partial, vertical, central, cross-sectional view of a modified form of the pelletizing section of the device.
Figure 14:
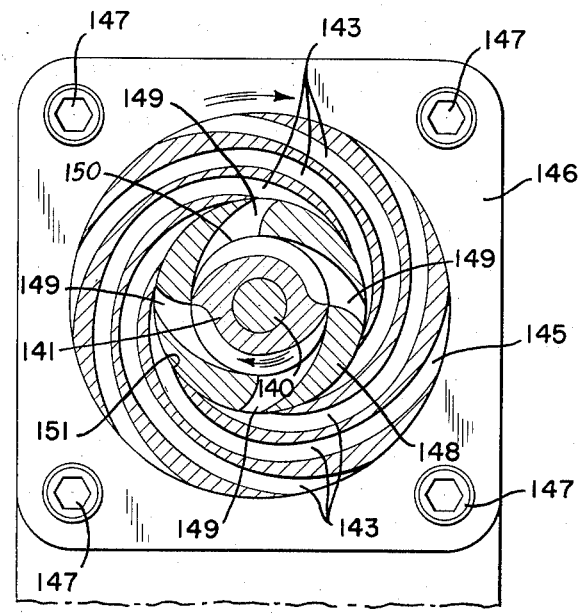
Fig. 14 is a cross-sectional view taken on the line 14—14 of Fig. 13.

The modified structure of Figs. 13 and 14 contemplates the use, as before, of the conventional extruder 110 having the worm shaft 111. As before, there is secured on the end face 114 of the extruder housing 112 a ring 146 which is of a construction different from the ring 116 of the preferred embodiment, as can be gathered from an examination of Fig. 14. The ring 146 is secured to the extruder housing by bolts 147. In this form of the device, the rotor 141 is not driven from an independent source. It is similarly shaped to the rotor 121, but has a central passage therethrough. A threaded, shouldered stud 140 is mounted in a threaded recess in the end of the worm shaft 111. A pelletizing ring 142 is keyed to the shouldered stud 140 and is held thereon by means of a nut 144.

The coacting outer face 145 of the ring 146, which is stationary, is smooth at its outer periphery but centrally has a cylindrical projection 148, which in turn has the graduated grooves 149 on its exposed end, see Fig. 14. The face of the pelletizing ring 142 in the area opposite the smooth face 145 of the ring 146, is provided with grooves 143 of spiral form, see Fig. 14, which form exit openings at peripherally spaced points. Each of the grooves 149 has a shearing edge 150 which cooperates with the edges of the exit openings of the grooves in the rotor 141 to form relatively large intermediate pellets. The spiral grooves 143 have shearing edges 151 at their entrance ends, which cooperate with the receiving ends of the grooves 143 to subdivide these pellets into smaller pellets. The relative motion between the fixed smooth annular face 145 and the spiral grooves 143 causes the pellets to be rolled outwardly along the grooves 143 to discharge at their outer ends.

Figure 15:
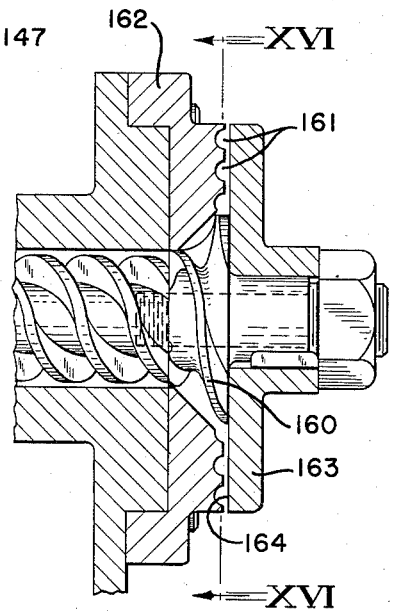
Fig. 15 is still another modified pelletizing device shown in vertical, central, cross-sectional form.
Figure 16:
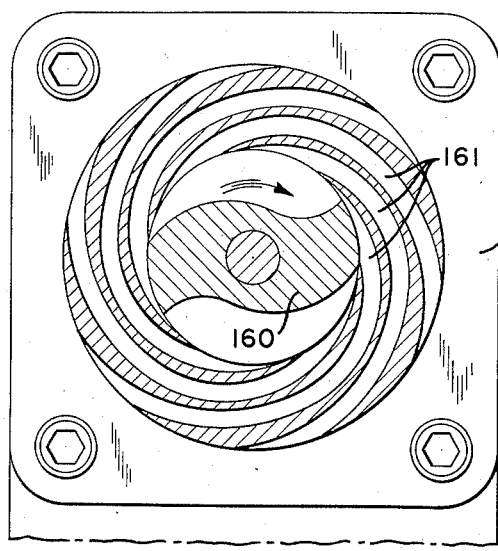
Fig. 16 is a cross-sectional view taken on the line 16—16 of Fig. 15.

Figs. 15 and 16 are views similar to Figs. 13 and 14 of a final modification of the subject matter of this invention. In this case a ring 162 is bolted to the end face of the tuber housing, as before. A hollow rotor 160 similar to the hollow rotor 141 is of generally frustoconical form and is provided with surface ribs forming passages of increasing diameter. This rotor fits into a frustoconical recess in the face of the ring 162, as shown in Fig. 15. This takes the place of the cylindrical projection 148 of Fig. 13, and its face grooves 149.

Pelletizing grooves 161 of spiral formation surround the frutoconical recess in the ring 162, as is clear from Figs. 15 and 16 and their exit ends are circumferentially spaced, as is clear from Fig. 16. In this case the rotatable ring 163 which is keyed to rotate with the rotor, as in the case of the structure of Fig. 13, has a smooth face 164 opposed to the spiral grooves 161. The material delivered by the worm shaft 111 is moved by the rotor 160 into the entrance ends of the grooves 161 where the individual pellets are gradually rolled to their discharge ends by the cooperation of the smooth face of ring 164.

From the above description it will be apparent to those skilled in the art that there is provided herein in various forms, novel apparatus for working and mixing stock and for pelletizing the mixed stock. The pelletizing of the stock is performed by a novel arrangement of grooves in the rotor and barrel or grooved discs and the maintenance problems inherent in the use of sharpened knives as heretofore used is eliminated. The passages or grooves through which the stock passes are all activated, that is, at least one side of all passages for the stock are formed by a moving member, so that the passages are self-cleaning on continued operation of the apparatus. The fact that all the passages are activated also permits lower pressures to be used and harder stocks to be extruded than is the case when conventional orifices or passages are used. The modifications of Figs. 5 and 6 provide novel means for adjusting the rate of flow of the stock through the mill so that the degree of working and mixing of the stock can be carefully controlled. The embodiment of Fig. 10, provides for discharge of pellets from a plurality of circumferentially displaced points, thereby providing increased capacity.

It is to be understood that the above description and accompanying drawings is for the purpose of illustration only and not by way of limitation and that changes and modifications may be made therein without departing from the spirit and the scope of the invention.

Having thus described our invention, what we claim and desire to protect by Letters Patent is:

1. A mill comprising, a rotatable rotor, a stationary barrel open at one end surrounding said rotor, means for rotating said rotor, a first set of helical threads on said rotor for forcing stock through said barrel toward said open end, said threads terminating at a point spaced from said open end, a second set of threads on said rotor initiating adjacent the point of termination of said first set of threads and extending toward said open end, grooves in said barrel communicating with said first and second sets of threads through which stock is forced by said first set of threads, said first and second set of threads being non-communicating except through said grooves in said barrel, said second set of threads serving to pelletize stock forced through said grooves and discharge said pellets from the open end of said barrel.

2. A mill comprising, a rotatable rotor, a stationary barrel open at one end surrounding said rotor, means for rotating said rotor, a first set of helical threads on said rotor for forcing stock through said barrel toward said open end, said first set of threads terminating at a point spaced from said open end, a second set of helical threads on said rotor initiating adjacent but spaced from the point of termination of said first set of hreads and extending toward said open end, said second set of threads increasing in depth toward said open end, grooves in said barrel interposed between said first and second set of threads through which the stock is forced by said first set of threads, said second set of threads serving to pelletize stock forced through said grooves.

3. A mill comprising, a rotatable rotor, a stationary barrel open at one end surrounding said rotor, means for rotating said rotor, a first set of helical threads on said rotor for forcing stock through said barrel, said first set of threads decreasing to zero depth at a point spaced from said open end of the barrel, a second set of helical threads on said rotor initiating adjacent the point of zero depth of said first set of threads and extending toward said open end, helical grooves in said barrel communicating with said first and second set of threads through which stock is forced by said first set of threads, said second set of threads serving to pelletize the stock forced through said helical grooves and discharge said pellets from the open end of said barrel.

4. A mill comprising, a rotatable rotor, a stationary barrel providing a bore open at one end in which the rotor is adapted to be rotated, means for rotating said rotor, a first set of helical threads on said rotor for forcing stock toward said open end, said first set of threads terminating at a point spaced from said open end, said bore of said barrel being enlarged between said open end and a point adjacent to said point of termination of said first set of threads, helical grooves in the bore of said barrel communicating at one end with said first set of threads and opening at the other end into said enlarged section of the bore, a second set of helical threads on said rotor in said enlarged section of the bore, said second set of threads serving to pelletize stock forced through said helical grooves into said enlarged section of the bore.

5. A mill comprising, a rotatable rotor, a stationary barrel open at one end surrounding said rotor, means for rotating said rotor, a first set of helical threads on said rotor for forcing stock through said barrel toward said open end, said first set of threads terminating at a point spaced from said open end of said barrel, a second set of helical threads initiating adjacent the point of termination of said first set of threads and extending toward said open end, grooves in said barrel extending between and overlapping the adjacent ends of said first and second set of threads to provide a passage through which stock is forced by said first set of threads toward said second set of threads, said first and second set of threads being non-communicating except through said grooves in said barrel, and means for effecting longitudinal relative movement between said barrel and said rotor to vary the amount said grooves overlap said sets of threads.

6. A mill comprising, a rotatable rotor, a stationary barrel surounding said rotor, helical threads on said rotor for forcing stock through said barrel towards one end of said barrel, a passage in said barrel adjacent said end of said barrel providing a stationary orifice through which the stock is forced by said helical threads, a ring forming an extension of said barrel, means for adjustably securing said ring to said end of said barrel for rotative angular adjustment, a passage in said ring overlapping and communicating with said passage in said end of the barrel, a second set of helical threads on the end of said rotor extending into the bore of said ring, said passage in said ring communicating with said second set of helical threads whereby stock forced through said passage in said ring is pelletized by said second set of threads.

7. Apparatus for pelletizing rubber-like compounds comprising, a rotary member and a stationary member providing opposed surfaces movable relative to each other in close proximity, an elongated groove in the surface of one of said members open at one end to permit the discharge of pellets therefrom, the other of said members having an opening therein communicating with the end of said elongated groove remote from said open discharge end in certain relative positions of said rotary and stationary members, means for forcing stock through said opening, means for effecting relative movement between said members to periodically bring said opening and said end of said groove remote from said open discharge end into communication whereby small sections of stock forced through said opening are deposited in said groove, said movement of said mmebers being such that the relative movement between said opposed surfaces is in the general direction of said elongated groove whereby the small sections of stock deposited in said groove are rolled along said groove and discharged as pellets from said open end of said groove.

8. A mill comprising, a stationary barrel providing a bore, a rotor rotatably mounted in said bore, helical grooves in the surface of said rotor for forcing stock toward one end of said barrel upon rotation of said rotor, spiral grooves formed in the end face of said barrel, an annular plate providing a surface closing the open faces of said spiral grooves secured to said rotor and rotatable therewith, said spiral grooves opening at their outer ends to the outer periphery of the barrel and communicating at their inner ends in certain relative rotative positions of said rotor and barrel with the grooves in the surface of said rotor whereby small sections of stock will be periodically forced from said helical grooves in the rotor into the inner ends of said spiral grooves and will be rolled along said spiral grooves upon rotation of said rotor and said annular plate and discharged as pellets from the outer ends of said spiral grooves.

9. A pelletizing apparatus, in combination with a housing having a smooth walled cylindrical passage having an open discharge end and a worm shaft rotatable therein, of pellet forming means comprising a ring attached to the open end of said housing, ribs on the face of said ring forming open ended grooves, a rotor supported in the central opening of said ring having ribs forming open ended grooves, and a second ring having a face adjacent and parallel to the grooves in the face of said first ring and rotatable with respect thereto.

10. In a pelletizing apparatus of the type described a fixed ring, a rotatable ring mounted coaxially with said fixed ring and having its opposed face spaced close to the opposed face of said fixed ring, a rotor in the central passage of said fixed ring having spiral ribs on its surface forming open ended grooves, additional open ended grooves on the opposed face of one of said rings the inner ends of which cooperate with said grooves in said rotor, and means for forcing material to be pelletized into said grooves in said rotor.

References Cited in the file of this patent

UNITED STATES PATENTS

| | | |
|---|---|---|
| 1,028,131 | O'Brien | June 4, 1912 |
| 1,904,884 | Royle | Apr. 18, 1933 |
| 2,200,997 | Royle | May 14, 1940 |
| 2,232,444 | Frenkel | Feb. 18, 1941 |
| 2,295,743 | Meakin | Sept. 15, 1942 |
| 2,700,940 | Johnson | Feb. 1, 1955 |
| 2,744,287 | Parshall et al. | May 8, 1956 |